Nov. 22, 1960 L. E. BARTON 2,961,615

HIGH-LEVEL MODULATED SIGNAL AMPLIFIER SYSTEM

Filed Aug. 18, 1959

INVENTOR.

LOY E. BARTON

BY

H. R. Newton

ATTORNEY

United States Patent Office 2,961,615

Patented Nov. 22, 1960

2,961,615

HIGH-LEVEL MODULATED SIGNAL AMPLIFIER SYSTEM

Loy E. Barton, Princeton, N.J., assignor to Radio Corporation of America, a corporation of Delaware Filed Aug. 18, 1959, Ser. No. 834,589

12 Claims. (Cl. 330—10)

Figure 1:
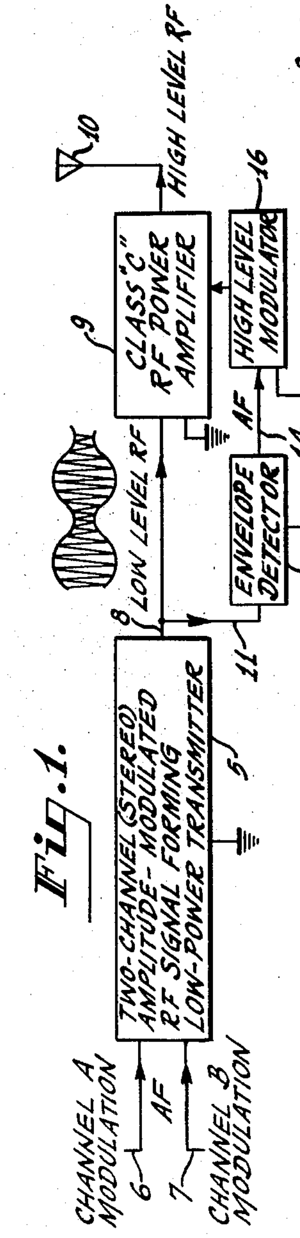

The present invention relates to high-level modulated signal transmitter systems, and more particularly to high-level amplitude-modulation transmitter power amplifiers for amplifying, to high power levels, composite amplitude-modulated carrier signals having signal phase modulation and/or frequency modulation information thereon for dual-channel or stereophonic broadcast transmission.

Composite stereophonic amplitude-modulated carrier signals are encountered in many proposed and prior art stereophonic or dual-channel amplitude-modulation signal transmission and reception systems. At the transmitting end, faithful transfer of the phase-angle or frequency modulation information on the modulated RF carrier signal, as well as the amplitude-modulation information, is essential for maintaining proper fidelity of reproduction and channel separation at the receiving end of such systems.

The patent to Kahn 2,666,133 represents a prior art system for amplifying a formed monophonic RF carrier signal, which has both amplitude and phase modulation components, with high efficiency to high power levels. In that system, the unmodified formed signal is not amplified, as it is limited to produce a phase-modulated signal. It is desirable, however, to provide composite RF carrier signal amplification to high power levels without limiting or other modification, particularly for stereophonic or two-channel signal transmission on a single carrier wave. Among other things, for limiting, additional equipment is used, and spurious phase modulation may be introduced when providing the desired amplitude modulation at the output amplifier.

Accordingly, it is an object of the present invention to provide an improved amplitude-modulated (AM) signal transmitter which will faithfully translate and amplify a formed composite amplitude-modulated RF carrier signal without undesirable phase shift and with a high degree of output stage efficiency.

A transmitter embodying the invention provides for transmitting an amplitude-modulated composite carrier signal from a high-efficiency class "C" final RF amplifier without shifting the phase relations of the modulated carrier signal components. Such a transmitter faithfully translates phase and/or frequency modulation information applied to the RF input circuit thereof. It may thus be used to amplify any composite amplitude-modulated RF signal having phase or frequency modulation components, with the high efficiency of the class "C" amplifier in the final output stage.

The transmitter system of the present invention is, therefore, particularly adapted for the amplification and transmission of two-channel or stereophonic program material and the like, in which two derived stereophonically related signals, such as A and B audio signals or the sum and difference thereof $(A+B)$ and $(A-B)$, are transmitted on a single carrier wave to receivers which translate the received signals and derive the A and B signals for respective application to separate sound producers.

Many stereophonic broadcast systems have been proposed for transmitting and receiving dual-channel or stereophonic program material at frequencies in the AM broadcast band, in a manner to be compatible with presently used or existing monophonic AM receivers. By "compatible" is meant a system which permits a special AM receiver to pick up, translate and reproduce a two-channel stereophonic program from a single amplitude-modulated RF carrier signal, while the same carrier signal may also be received and translated by an ordinary AM receiver as a faithful monophonic sound reproduction.

Prior art compatible AM stereo systems may be classified, according to their signal make-up, as "additive" or "multiplicative." By "additive" is meant a stereo signal which may be viewed as comprising a carrier having in-phase sidebands produced by amplitude modulation with one stereo signal, to which are added angular side-bands representative of a signal stereophonically related to that which produces the in-phase sidebands. By "multiplicative" is meant a system in which one stereo signal, such as $(A+B)$, amplitude modulates a carrier wave to produce a carrier with sidebands which are then phase or frequency modulated with a signal stereophonically related to the first signal, such as $(A-B)$.

One example of a prior art additive system is that in which two stereophonically related signals are transmitted as amplitude modulation on the respective upper and lower sidebands of a carrier wave. This system may be termed an "independent sideband" system. In another form of prior art additive system, referred to as the "quadrature sideband" system, the carrier wave is separated into two components 90 degrees displaced from each other, and these components are respectively amplitude modulated by the stereophonically-related signals. The modulated carriers and sidebands are then combined and transmitted.

An example of a prior art multiplicative system is one in which a single carrier wave is first phase modulated by one stereophonic signal $(A-B)$, and the phase-modulated wave is then amplitude modulated by the other stereophonic signal $(A+B)$. Such a signal differs from that produced by an additive system in that its phase-modulation sidebands are themselves amplitude-modulated. A system of this type is disclosed in British Patent No. 540,185 (1941).

A composite modulated RF carrier signal as produced by any of the additive or the multiplicative types of AM stereo systems thus contains phase or frequency modulation components that must be faithfully amplified and transmitted. The transmitter of the present invention is particularly adapted for efficient high-level signal transmission in both types of dual-channel or stereophonic broadcast systems.

It is, therefore, a further object of this invention to provide an improved high-level amplitude-modulation (AM) transmitter that will faithfully amplify a formed composite RF carrier signal having phase and/or frequency modulation components and which, therefore, may be used as a high-efficiency stereophonic or dual-channel transmitter in connection with a low-level signal-forming source of stereophonic composite amplitude-modulated RF carrier signals.

In accordance with the invention, a composite modulated RF signal, such as any of the additive or multiplicative type AM stereo signals, is formed in a suitable low-power forming transmitter or exciter and applied to essentially linear RF signal amplifying means including a plate-modulated class "C" RF output power amplifier coupled on its output side to a transmitting antenna. The formed composite RF signal is modulated by stereophonic or dual-channel audio-frequency modulation signal information, which is applied thereto in the signal forming process. This modulation signal information may be stereophonic A and B channel audio signals, or the sum and difference $(A+B)$ and $(A-B)$ audio signals. The same modulation signal information is also applied to the plate circuit of the class "C" RF power amplifier, and in a manner to provide essentially the same percentage modulation in the resultant high-power-level RF output signal as is present in the formed modulated RF signal. In the present transmitter system, the modulation derived from the envelope of the formed composite modulated RF signal, is applied to the plate circuit of the class "C" RF power amplifier and the same composite RF signal, without limiting, is applied to the input circuit of the class "C" RF power amplifier.

With this system, the low-level composite modulated RF signal is faithfully amplified to useful power levels at power efficiencies approximately equal to existing high-level monophonic or single-channel AM transmitters, without introducing spurious or coincidental phase modulation, due to the high-level modulation. Such balanced dual modulation of the class "C" RF power amplifier prevents the introduction of undesired phase modulation into the high-level output modulated signal which is transmitted, and at the same time provides faithful transfer of any desired phase or frequency modulation information on the low-level RF input signal to the amplified RF output signal of the class "C" amplifier.

The RF circuits in the amplifier preceding the class "C" output stage are preferably of the broad-band or band-pass type, having a relatively broad frequency response so that the desired RF signal sidebands are not attenuated or limited.

The high-level audio-frequency modulating signal is derived, preferably, from the envelope of the preformed phase and amplitude-modulated or composite signal, whereby the proper harmonic information is retained in the high-level modulated output signal. In the present system, therefore, the modulation envelope, that is, the amplitude modulation on the preformed composite RF signal, is used to provide the signal source for the high-level modulating signal of the class "C" RF power amplifier. It is recognized that there may be considerable phase shift of the audio-frequency modulation of the RF signal relative to the audio-frequency modulating signal, in the process of forming the composite modulated RF signal for a dual-channel or other stereo system. Therefore, in the present transmitter system, to avoid the effect of this phase shift, the formed composite RF driving signal itself is rectified, and this rectified signal is employed, after amplification, as the high-level modulating signal for the class "C" power amplifier.

In the present transmitter system, therefore, in accordance with the invention, the phase of the modulation on the input RF signal for the class "C" RF power amplifier is essentially the same as that of the modulating signal applied to that amplifier, and the percentage modulation is essentially the same as the percentage modulation on said input RF signal. With this system, the degree of drive applied to the class "C" RF power amplifier input circuit may be increased to obtain substantially maximum carrier power output, and the RF excitation of the power amplifier will be sufficient at all times to provide the drive for the instantaneous modulation applied to the plate circuit. Such operation, as herein pointed out, reduces undesired spurious or incidental phase modulation in the power amplifier, while any desired phase modulation in the RF input signal will be transferred through the power amplifier as a faithful reproduction, at high power level, of the signal from the forming transmitter or exciter.

The invention will further be understood from the following description, when read in connection with the accompanying drawing, and its scope is pointed out in the appended claims.

Figure 2:
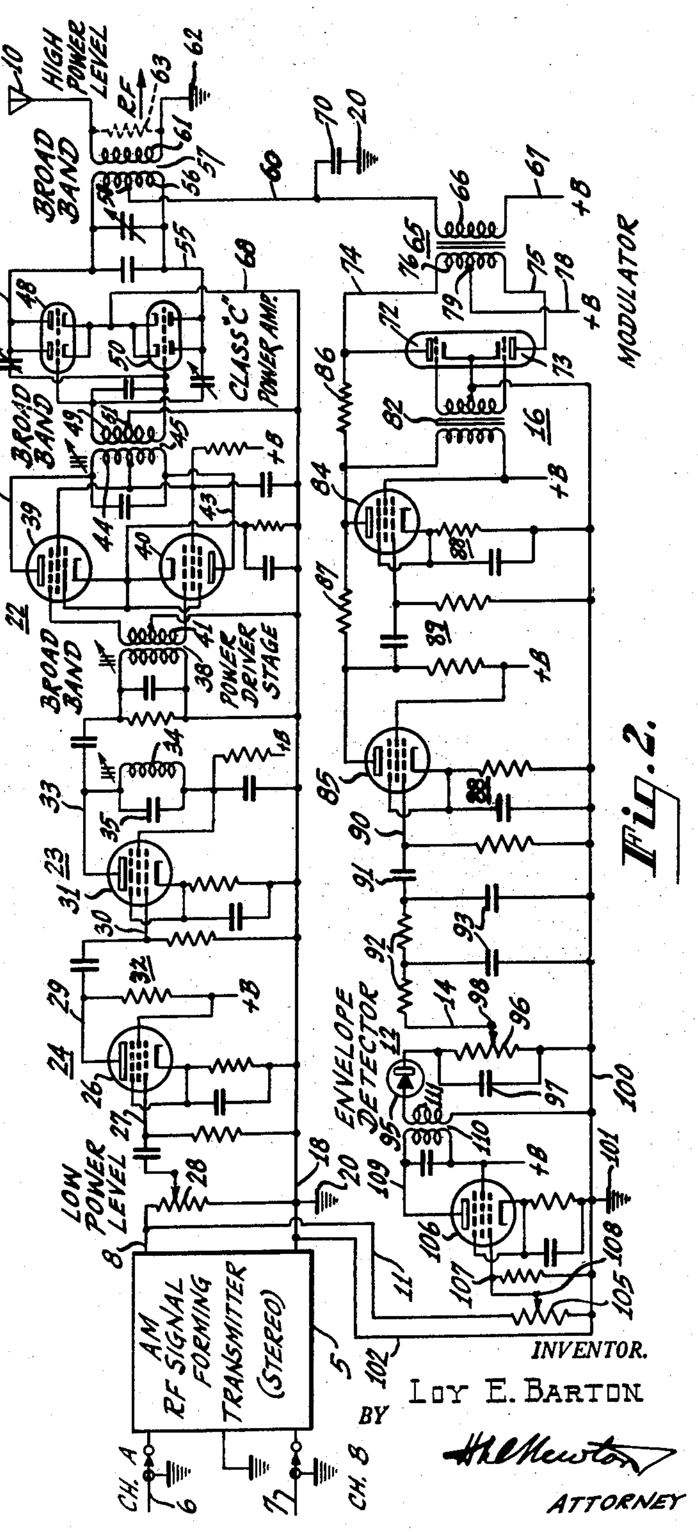

In the drawing,

Figure 1 is a schematic block diagram of the component and circuit arrangement for a transmitter embodying the invention, and Figure 2 is a schematic circuit diagram of a transmitter showing the complete circuits in accordance with the invention, as arranged in Figure 1.

Referring to the drawing, in which like circuits and components are designated by the same reference numerals in both figures, and referring particularly to Figure 1, a composite modulated RF signal, such as an angular-sideband AM stereo signal, is formed in a suitable low-power transmitter 5 as the result of the application thereto of dual-channel or stereophonic audio-frequency (channel A and channel B) modulation signals from any suitable source through modulation signal input circuits 6 and 7. The low-power-level modulated output signal from the transmitter 5 is applied through a suitable coupling circuit 8, without limiting or other modification, to a class "C" output RF power amplifier 9 as the excitation RF driving signal therefor. The output power amplifier may be coupled to a suitable transmitting antenna 10 as indicated.

The formed composite RF signal, which carries the dual-channel or stereophonic information is thus amplified in the class "C" RF power amplifier 9 by reason of the coupling connection. The modulated RF output signal from the signal forming transmitter 5 is also applied through a branch circuit 11 to a rectifier or other suitable envelope detector 12 from which an audio-frequency modulating signal for the class "C" RF power amplifier is derived at an output circuit 14. A high-power-level modulator 16 is coupled to the class "C" RF power amplifier 9 and is connected with the envelope detector output circuit 14 to receive the modulating signal therefrom.

The high-level RF modulation signal (audio) is derived from the preformed modulated composite RF signal in order that it may have the proper audio wave form. It is for this reason, as hereinbefore noted, that the envelope of the amplitude modulation on the low-power-level excitation RF signal at the output circuit 8 is used as the source for the high-level RF modulation signal for the class "C" RF power amplifier 9. This avoids the possibility of phase shift of the audio-frequency modulation signals from affecting the high-power-level modulation of the class "C" RF power amplifier, and, more importantly, results in the cancellation of spurious or out-of-band spectrum components.

The purpose of the transmitter is to amplify and transmit an amplitude-modulated signal through a high efficiency class "C" final RF amplifier, such as the amplifier 9, without shifting the carrier signal component phase relation due to the modulation applied through the high-level modulator 16. The forming transmitter or source 5 being coupled directly through the circuit 8 to the input circuit of the class "C" amplifier 9, such a transmitter will faithfully transfer phase information which may be present in the low-level RF signal in the input connection circuit 8. The transmitter may therefore be used to amplify a composite amplitude modulated RF signal to high power and to obtain the high efficiency of the class "C" amplifier for this purpose.

When the RF input signal at the circuit 8 is modulated to a given percentage by the A and B channel information applied at the input circuits 6 and 7, a modulating signal consisting of the sum of the $A+B$ audio signals may also be applied to the audio modulation system of the transmitter to modulate the class "C" power output amplifier 9 essentially to the same percentage modulation as at the input or coupling circuit 8 for the amplifier. Preferably, as will hereinafter be shown and described, the modulated RF signal is applied to the input or grid circuit of the amplifier 9 while the high-level corresponding modulation through the modulator 16 is applied to the plate circuit, or the plate-current supply circuit, of the amplifier 9. The net result is that such excitation of the class "C" amplifier substantially prevents the introduction of phase modulation into its output circuit and at the same time any phase information on the RF input signal is transferred faithfully to the output circuit of the class "C" amplifier.

It is preferable, that the formed composite RF signal at the circuit 8 be rectified to obtain the modulating signal for the output class "C" amplifier 9, proportional to the envelope of the formed RF signal from the exciter.

In any case, the phase of the modulation on the RF composite signal at the circuit 8 should be substantially the same as that of the modulation voltage applied to the class "C" amplifier 9 through the modulator 16. In general, for a given percentage modulation in the composite RF signal at the circuit 8, there should be a corresponding percentage modulation due to the high-level modulation at the output circuit to the antenna 10. If this amplitude ratio is not substantially maintained, the phase of the RF input may be altered at the output so that the two channels, such as stereo channels, cannot be separated adequately at the receiver.

Referring now to Figure 2 along with Figure 1, the AM two-channel or stereo RF signal forming transmitter 5 is provided with channel A and channel B audio-frequency modulation signals through shielded input circuits or lines 6 and 7. These signals may be derived from any signal source, as is well understood, such as a pair of spaced microphones, or a stereophonic phonograph record pickup device (not shown). In the present example, the transmitter 5 may be considered to be of the phase-carrier type in which two RF carrier signals having a predetermined angular relation to each other, such as 60° for example, are each modulated by one of the dual-channel or stereophonically-related audio-frequency signals A and B, and are then combined to form a composite carrier. As the channel A modulation is applied to one carrier and the channel B modulation is applied to the other, the combining of the carriers provides a set of upper and lower sidebands dependent upon the A modulation, and a second set of upper and lower sidebands dependent upon the B modulation, which retain the same angular relation to each other and to the composite carrier as the original carriers. This composite modulated RF signal is representative of any like composite signal, having phase and amplitude modulation information thereon, which may be provided by the transmitter or exciter 5 and delivered at the output circuit 8 at low power level for further amplification and application to the class "C" output amplifier stage.

In a practical transmitter circuit as shown in Figure 2, the low side of the circuit 8 is provided by a conductor 18 connected to the transmitter 5 as shown and to common or chassis ground 20 for the transmitter system. The conductor 18 provides a common ground return connection for the various sections of the transmitter which, in addition to the class "C" RF power amplifier stage 9, includes a power driver stage 22 and two cascade-connected voltage-amplifier stages 23 and 24, interposed for essentially linear amplification between the output circuit 8 and the class "C" amplifier stage 9.

As shown, the amplifier stage 24 comprises an amplifier tube 26 having an input circuit 27 coupled with the output circuit 8 through a potentiometer or gain control device 28 for adjusting the level or voltage of the RF signal which is applied to the output stage 9. The output circuit of the amplifier stage 24, indicated at 29, is coupled to the input circuit 30 of the amplifier stage 23 which includes a second amplifier tube 31. Both tubes 26 and 31 may be of the screen-grid type and the voltage amplifier comprising these two stages serves to provide an amplified RF signal at the output circuit 33 of the second stage 23. This output circuit of stage 23 is tuned to the RF signal frequency by a tuning inductor 34 and tuning capacitor 35 connected in parallel with each other and in shunt relation to the circuit 33. The output circuit 33 is coupled, through a tuned broad-band coupling transformer 38, with the power driver stage 22 which comprises a pair of amplifier tubes 39 and 40 connected in balanced or push-pull relation to the secondary 41 of the transformer 38, and having balanced output circuits 42 and 43 connected with the tuned primary winding 44 of a broad-band input coupling transformer 45 for the class "C" amplifier 9. Suitable RF phase correction means may be provided in the RF amplifier channel, preferably between amplifier stages 23 and 24, as by proper choice of the circuit components in the RC coupling circuit 32, or other suitable circuit means. In any case there is no signal limiting. Only broad-band essentially linear amplification of the formed RF signal between the supply means 5 and the class "C" amplifier 9 is provided by the driver amplifier 22 and the preceding voltage amplifiers.

The class "C" amplifier shown comprises a push-pull circuit having a pair of parallel-connected amplifier tubes 48 connected to one side of the push-pull secondary winding 49, and a second pair of parallel-connected amplifier tubes 50 connected with the opposite side of the winding 49, which winding has a center tap 51 connected to the ground lead 18 as shown. The common output anode circuit 54 for the tubes 48 and the common output anode circuit 55 for the tubes 50 are connected with the tuned push-pull-connected primary winding 56 for an antenna coupling transformer 57. A center tap 58 on the primary winding 56 is connected to an anode-current supply lead 60.

The amplifier tubes 48 and 50 are of the proper type and connected for zero-bias class "C" operation in the present example. This mode of operation tends to minimize undesired spurious phase shifts due to high level modulation. In this case an audio-modulation voltage is not needed on the class "C" input grids as would be the case if bias were used. If a biased class "C" amplifier is used, an audio voltage proportional to the modulation voltage, which may be derived from the transformer 65, may be applied to the class "C" input circuit, superimposed on the bias voltage and in phase with the incoming signal envelope. This audio voltage is added to prevent or minimize spurious phase modulation due to plate modulation of the class "C" amplifier when biased tubes are used. In some cases a grid resistor and coupling capacitor may be used to derive the bias and superimposed audio signal. These three modes of operation cover the usual circuitry involved in applying the invention to existing transmitter circuits.

The secondary 61 of the output coupling transformer 57 is connected to the transmitter ground 62 and to the antenna 10 and the antenna system then provides a relatively heavy load on the secondary which is indicated by the dotted resistor 63 in parallel with the winding 61. This load is sufficient to make the coupling to the antenna have a relatively broad-band characteristic corresponding to the broad-band coupling provided by the tuned interstage coupling transformers 38 and 45. The coupling circuits between the amplifier stages 23 and 24 are shown as being of the resistance-coupled type to represent any suitable amplifier coupling circuits having a relatively broad-band characteristic, whereby the modulated low-power RF signal derived from the transmitter 5 at the circuit 8 can be amplified to drive the class "C" amplifier at the required amplitude for full power output to the antenna 10, without sideband attenuation and without phase modulation, that is, without changing the phase information provided by the channel A and channel B information on the composite carrier signal.

Plate circuit modulation is provided for the class "C" amplifier 9 through a modulation transformer 65 having a secondary winding 66 connected between the anode circuit supply lead 60 and a +B high-voltage supply lead 67. Plate current for the tubes 48 and 50 is then supplied from the lead 67 through the secondary winding 66 and the supply lead 60 to the center tap 58 on the RF output transformer primary 56. The plate current then flows through each half of the primary winding 56 to the respective plate circuits 54 and 55 for the tubes 48 and 50. A cathode return circuit 68 provides a current path back to the common ground connection 18 which is the —B or negative side of the plate supply circuit, as is well understood. An RF bypass capacitor 70 is connected between the lead 60 and common ground 20, to decouple the modulator 16 from the amplifier 9 for RF currents.

The modulator 16 comprises a pair of push-pull triode tubes 72 and 73 in a common envelope having respective plate circuits 74 and 75 connected to the terminals of the primary winding 76 of the modulation transformer 65. Anode current is supplied to the plate circuits 74 and 75 through the primary winding 76 from a supply lead 78 and a center tap 79 on the primary winding. The modulator tubes 72 and 73 are driven through a push-pull coupling transformer 82 from a preceding voltage-amplifier stage comprising a screen-grid amplifier tube 84, which is resistance coupled to a transformer 65 at the secondary of the first-stage amplifier tube 85 as shown. Feedback coupling is provided between the amplifier stages through suitable feedback resistors 86 and 87. Any additional audio phase correction in the modulating signal amplifier, to make the audio signal phase correspond to the RF envelope phase input to the class "C" amplifier, may be provided by the proper choice of circuit components in the cathode circuits 88 and coupling circuit network 89 of the amplifiers 84 and 85 should the feedback be insufficient.

The grid input circuit 90 of the first stage amplifier 85 is coupled through a capacitor 91 and an RF filter network, comprising two series resistors 92 and two shunt bypass capacitors 93, to the output circuit 14 of the envelope detector 12. The latter comprises a diode 95 and a diode output resistor 96 provided with the usual bypass capacitor 97 for RF currents. The output circuit 14 is connected to a movable tap 98 on the output resistor 96 to vary the modulation voltage applied to the modulator 16 from the envelope detector. The detector load resistor 96 is connected, as shown, to a common circuit return lead 100 for the modulator which is connected with chassis ground 101. The modulator ground is connected with the amplifier ground through a ground connection lead 102, whereby there is provided a common ground or circuit return means for the system.

The envelope detector 12 is coupled to the modulated RF signal circuit 8 through the signal-supply branch circuit 11 and a shunt input coupling impedance or resistor 105. An amplifier stage, comprising the amplifier tube 106 is interposed between the circuit 11 and the envelope detector 12 for applying amplified RF signals to the diode 95 sufficient to provide an audio-frequency modulating signal of desired amplitude, and to act as a buffer for the detector. In the present example, the input circuit 107 of the amplifier 106 is variably connected to the circuit 11 through a movable tap 108 on the coupling resistor 105. The anode output circuit 109 of the tube 106 is coupled through an RF tuned coupling transformer 110 to the diode 95, the transformer secondary 111 being connected between the diode and ground 100—101 to complete the diode circuit.

The transmitter of Figure 2 operates in accordance with the invention as outlined in the description of Figure 1 and the general circuit configuration and construction. The specific transmitter circuits shown in Figure 2 provide a practical embodiment of the invention. These circuits, as shown, provide for amplifying the composite signal comprising the carrier and its angular upper and lower sidebands, without shifting the carrier phase relations due to the modulation which is applied to the amplifier. By the use of a modulated class "C" power amplifier, an efficiency approximately equal to high-level amplitude-modulated monophonic radio transmitters is attained for stereophonic or dual-channel broadcasting.

In operation, the stereophonic or dual-channel, amplitude-modulated signal, that is, the formed RF modulated signal with its phase angle information is amplified successively through the amplifiers 24, 23 and 22 at the desired RF broadcast frequency, and applied to the class "C" amplifier stage 9 to drive it for maximum power output for any instantaneous plate voltage. From the output stage 9, the amplified RF signal is then transmitted through the tuned output coupling circuits to the antenna 10 for broadcasting. Like the loaded broad-band output coupling at the antenna, the intermediate coupling circuits preceding the amplifier stage 9 are broadband or of the band-pass type to prevent attenuation of the signal sidebands, and the low-level RF signal at the output circuit 8 is thus amplified and applied directly to the class "C" RF power amplifier 9 without the intermediary of any limiting or transmission change which would affect in any way the phase modulation information on the RF carrier.

A portion of the formed modulated RF signal at the output circuit 8 is derived therefrom through the coupling circuit 11 and after amplification in the amplifier 106 this signal is rectified in the envelope detector 12 to provide the channels A and B audio frequency signal which is thus derived from the envelope of the formed signal and retains the proper wave-form information for modulation of the class "C" amplifier. The variable tap 108 on the resistor 105 provides a variable gain-control device for limiting the voltage applied to the rectifier 95 in the envelope detector so that the rectifier is not overloaded.

From the output circuit 14 of the detector 12, the derived audio-frequency modulation signal is passed through the filter network 92—93 to remove any remaining RF carrier and thus prevent RF signal overload on the first amplifier stage 85. The modulation signal is then amplified in the amplifier stages 85—84 to a sufficiently high level to drive the modulator stage comprising the modulator tubes 72 and 73. The feed-back amplifier stages 85—84 provide lower output impedance and a better frequency response in the modulator circuit with no appreciable audio phase shift. Through the modulation transformer 65, the modulator stage serves to control the flow of plate current to the class "C" amplifier stage circuits to affect plate circuit modulation of the class "C" amplifier.

The phase of the modulation on the composite RF signal at the class "C" amplifier grid circuit, that is, at the terminals of the coupling transformer secondary 49, should be substantially the same as the modulation applied to the class "C" amplifier plate circuit at the modulation transformer 65. By substantially the same phase, is meant that when the envelope of the RF on the grids of the output class "C" tubes is at maximum amplitude, the audio modulating signal is also at a maximum amplitude.

The percentage modulation provided by the modulator on the plate circuit of the class "C" amplifier should be substantially the same as the percentage modulation which is on the formed signal derived from the output circuit 8, otherwise, the phase of the RF input signal in the grid circuit of the class "C" amplifier may be altered at the RF output and the dual-channel or stereophonic information cannot be separated adequately because of the spurious phase modulation which would result. As hereinbefore noted, the amplifier channels are arranged to provide proper signal phase transfer. For adjusting the modulation strength, the gain control device 98—96 in the output circuit of the envelope detector is provided as noted. By this means the same percentage modulation at the modulation transformer 65 and at the plate circuits 54 and 55 of the class "C" amplifier may be attained as provided by the applied signal at the input circuit of the amplifier tubes 48 and 50. From the foregoing description, it will be seen that the RF phase, the audio modulating phase, and the RF envelope phase should be substantially correct for proper operation.

It should be noted that after the controls 28, 105, and 96 are once adjusted for minimum phase distortion in the transmitter, for a given condition of the circuits and for a given signal at the low-level output circuit 8, no further adjustment of these controls is needed. Modulation levels are maintained at the forming transmitter or exciter 5 during program time.

The amplitude modulation on the RF signal applied to the grids of the class "C" amplifier corresponding to the amplitude modulation applied to the plate circuit of that stage, tends to maintain a more nearly constant angle of conduction of grid current over the audio cycle. This effect gives the beneficial result of reducing spurious or incidental phase modulation which would normally be produced by the variation of the grid circuit impedance over an audio cycle, and this reduction thereby permits the transmission of the amplified RF signal as a more faithful reproduction of the signal from the forming transmitter or other source of formed modulated RF signals having dual-channel or stereophonic audio frequency information thereon.

It should be noted that the instantaneous RF signal on the grids of the RF output tubes varies with modulation. However, the instantaneous audio plate voltage due to modulation varies accordingly so that there is always just sufficient RF drive at all times to produce class "C" operation of the output tubes. This feature does not require increased driving power in the driving amplifier. It is not necessary, therefore, to limit the RF signal applied to the class "C" power output amplifier. The amount of grid drive required is dependent upon the modulating voltage at the plate circuit. With no limiter interposed, this is automatic since the grid drive RF signal voltage and the modulating voltage are derived from the formed signal at the same point in the system (circuit 8).

From the foregoing description it will be seen that a transmitter in accordance with the invention provides for transmitting an amplitude-modulated composite carrier signal from a high efficiency class "C" final RF power amplifier without shifting the carrier signal component phase relation due to the modulation. Such a transmitter also faithfully translates phase information applied to the RF input circuit thereof, and may be used to amplify any composite amplitude-modulated signal, having signal phase information, to high power levels.

With this system, low-level composite modulated RF signals may be amplified to high power levels at power efficiencies approximately equal to high-level monophonic or single-channel AM transmitters, and without shifting the carrier signal component phase relation due to the high-level modulation.

As set forth in the foregoing description of the invention, the subject transmitter amplifies a formed radio signal, having at least amplitude modulation, to a desired power level with negligible distortion and without the introduction of spurious phase or frequency modulation. It is known that ordinary AM broadcast stations have a fair degree of phase modulation because of the amplitude modulation. The use of the invention would then amplify a formed signal having amplitude modulation only and spurious phase or frequency modulation would not be introduced by the transmitter.

What is claimed is:

1. A high-level modulated-signal transmitter system comprising in combination, signal supply means providing a formed radio-frequency signal having at least amplitude-modulation information thereon, a class "C" radio-frequency signal amplifier coupled with said signal supply means for receiving the modulated signal output therefrom for amplification and broadcast transmission, high-level modulator means coupled to said class "C" amplifier for applying high-level modulation thereto, means coupled to said signal supply means for deriving therefrom an audio-frequency modulating signal representative of the envelope of said formed radio-frequency signal, and means for applying said audio-frequency modulating signal to the high-level modulator means for modulating said class "C" amplifier in phase with the envelope of the signal applied thereto from said signal supply means.

2. A high-level modulated-signal transmitter system comprising in combination, signal forming means providing a modulated radio-frequency signal with composite phase or frequency and amplitude-modulation information thereon, a class "C" radio-frequency signal amplifier broad-band coupled with said signal forming means for receiving the full modulated signal output therefrom for amplification and broadcast transmission, high-level modulator means coupled to said class "C" amplifier for applying high-level modulation thereto, envelope detector means coupled to said signal forming means for deriving therefrom an audio-frequency modulating signal representative of the envelope of said modulated radio-frequency signal, and means for applying said audio-frequency modulating signal to the high-level modulator means for modulating said class "C" amplifier in phase with the envelope of the signal applied thereto from said signal forming means.

3. An amplitude-modulation signal transmitter system comprising in combination, modulated signal forming means having a signal output circuit, a class "C" radio-frequency power amplifier having a broad-band linear driver amplifier connected for power amplification and broadcast transmission of the full modulated signal from said output circuit, high-level modulator means for said class "C" power amplifier connected for applying plate-circuit modulation in phase with the envelope of the input signal applied thereto through said driver amplifier and with substantially the same percentage modulation, an envelope detector coupled to said signal output circuit for deriving from the formed modulated signal an audio-frequency modulating signal for said class "C" amplifier representative of the modulation envelope thereon, and means coupled to said envelope detector and including a feed-back amplifier for applying said audio-frequency modulating signal to the high-level modulator means to effect said plate-circuit modulation of the class "C" amplifier.

4. An amplitude-modulation signal transmitter system comprising in combination, modulated-signal forming means providing a low-level radio-frequency signal with stereophonic modulation information thereon, a class "C" radio-frequency power amplifier having broad-band coupling with said first named means for receiving the full and unmodified modulating signal output therefrom for amplification and transmission at high level, modulator means plate-circuit coupled to said class "C" amplifier for applying high-level modulation thereto in phase with the envelope of the signal applied to said amplifier from said signal forming means, an envelope detector coupled to said signal forming means for deriving therefrom an audio-frequency modulating signal representative of the modulation envelope of said low-level radio-frequency signal, and feedback amplifier means coupled to said detector for applying said audio-frequency modulating signal to the high-level modulator.

5. An amplitude-modulation signal transmitter system comprising in combination means providing a formed low-level radio-frequency signal with multiple-channel modulation information thereon, a class "C" radio-frequency power amplifier having broad-band coupling with said first-named means for receiving the full and unmodified modulated signal output therefrom for amplification and transmission at high level, modulator means plate-circuit coupled to said class "C" amplifier for applying high-level modulation thereto in phase with the envelope of the signal applied to said amplifier from said first-named means and with substantially the same percentage modulation, an envelope detector including a diode signal rectifier variably coupled to said signal supply means for deriving therefrom an audio-frequency modulating signal representative of the modulation envelope of said low-level radio frequency signal, and means coupled to said diode rectifier and including a radio-frequency filter and feedback amplifier means in cascade relation for applying said audio-frequency modulating signal to the high-level modulator.

6. A stereophonic amplitude-modulation transmitter system comprising in combination, signal forming means providing a modulated radio-frequency signal with composite phase and amplitude-modulation information thereon representative of two stereophonically related sound signals, a class "C" radio-frequency signal output power amplifier, broad-band linear radio-frequency amplifier means connected between said signal forming means and said class "C" amplifier for applying thereto the full modulated radio-frequency signal from said signal forming means, high-level modulator means for said class "C" amplifier connected for applying high-level plate-circuit modulation thereto in phase with the envelope of the applied radio-frequency signal and with substantially the same percentage modulation, an envelope detector variably coupled to said signal forming means for deriving therefrom an audio-frequency modulating signal for the class "C" amplifier representative of the modulation envelope of said modulated radio-frequency signal, and means coupled to said detector and including a feed-back amplifier for applying said audio-frequency modulating signal to the high-level modulator for modulating said class "C" power amplifier.

7. An amplitude-modulation signal transmitter system comprising in combination, signal supply means providing a formed radio-frequency signal with composite phase- and amplitude-modulation information thereon, an electronic-tube class "C" radio-frequency power amplifier having a signal input grid circuit broad-band coupled with said signal supply means for receiving the full modulated radio-frequency signal output therefrom and amplification at high level for broadcast transmission, said class "C" power amplifier having a signal output plate circuit, high-level modulator means coupled to said amplifier plate circuit for applying high-level plate-circuit modulation to said amplifier in phase with the envelope of said formed radio-frequency signal applied to said input grid circuit, detector means coupled to said signal supply means for deriving therefrom an audio-frequency modulating signal representative of the modulation envelope of said formed radio-frequency signal, and means for applying said audio-frequency modulating signal to the high-level modulator means for said plate-circuit modulation of the class "C" power amplifier, the amount of grid circuit drive for said amplifier being thereby automatically dependent upon the modulating signal voltage at the plate circuit, for effective composite signal amplification and transmission.

8. An amplitude-modulation signal transmitter system comprising in combination, signal supply means providing a formed radio-frequency signal with composite phase- and amplitude-modulation information thereon, a broad-band linear radio-frequency amplifier, an electronic-tube class "C" radio-frequency power amplifier having a signal input grid circuit coupled through said broad-band amplifier with said signal supply means for receiving the full modulated radio-frequency signal output therefrom and amplification at high level for broadcast transmission, said class "C" power amplifier having a signal output plate circuit, high-level modulator means coupled to said amplifier plate circuit for applying high-level plate-circuit modulation to said amplifier in phase with the envelope of said formed radio-frequency signal applied to said input grid circuit, detector means coupled to said signal supply means for deriving therefrom an audio-frequency modulating signal representative of the modulation envelope of said formed radio-frequency signal, and feedback amplifier means for applying said audio-frequency modulating signal with controlled phase and amplitude to the high-level modulator means for said plate-circuit modulation of the class "C" power amplifier, the amount of grid circuit drive for said amplifier being thereby automatically dependent upon the modulating signal voltage at the plate circuit, for effectively reducing spurious phase modulation due to the plate-modulation.

9. A stereophonic amplitude-modulation signal transmitter system comprising in combination, stereophonic signal forming transmitter means providing a formed low-level radio-frequency signal with composite phase- and amplitude-modulation information thereon representative of two stereophonically related sound signals, an electronic-tube class "C" radio-frequency power amplifier having a signal-input grid circuit broad-band coupled with said signal forming means for receiving the full modulated radio-frequency signal output therefrom and amplification at high-level for broadcast transmission, said power amplifier having a signal-output plate circuit, high-level modulator means including an audio-frequency modulating amplifier stage coupled to said class "C" amplifier output plate circuit for applying high-level plate-circuit modulation to said class "C" amplifier, envelope detector means coupled to said signal forming means for deriving therefrom an audio-frequency modulating signal representative of the modulation envelope of said formed radio-frequency signal, and a feedback voltage amplifier connected between said detector means and said modulating amplifier stage for applying said audio-frequency modulating signal therethrough to the class "C" amplifier plate circuit in phase with the envelope of the radio-frequency signal applied to the signal input grid circuit from said signal forming means.

10. A stereophonic amplitude-modulation signal transmitter system comprising in combination, signal supply means providing a formed radio-frequency signal with composite phase- and amplitude-modulation information thereon representative of two stereophonically related sound signals, a broad-band linear radio-frequency amplifier, an electronic-tube class "C" radio-frequency power amplifier having a signal input grid circuit coupled through said broad-band linear amplifier with said signal supply means for receiving the full modulated radio-frequency signal output therefrom and amplification at high level for broadcast transmission, said class "C" power amplifier having a signal output plate circuit, high-level modulator means coupled to said amplifier plate circuit for applying high-level plate-circuit modulation thereto in phase with the envelope of said formed radio-frequency signal applied to said input grid circuit, envelope detector means coupled to said signal supply means for deriving therefrom an audio-frequency modulating signal representative of the modulation envelope of said formed radio-frequency signal, and feed-back amplifier means for applying said audio-frequency modulating signal to the high-level modulator means for modulating said power amplifier, whereby the input grid-circuit drive for the class "C" amplifier and the plate-circuit modulation therefor are derived from the signal supply means as a common signal source, and the amount of grid circuit drive required for the class "C" amplifier is automatically dependent upon the modulating voltage at the plate circuit, for effective signal transmission.

11. A high-level amplitude-modulation stereophonic signal transmitter system comprising in combination, signal-forming means providing a modulated radio-frequency output signal with composite phase and amplitude-modulation information thereon representative of two stereophonically related sound signals, a broad-band linear radio-frequency signal amplifier, a class "C" radio-frequency signal output amplifier coupled through said broad-band amplifier with said signal forming means for receiving the full modulated signal output therefrom, high-level modulator means including a modulator amplifier stage coupled to said class "C" amplifier for applying high-level amplitude modulation thereto, envelope detector means coupled to said signal forming means for deriving therefrom an audio-frequency modulating signal representative of the envelope of said modulated radio-frequency signal, and means including a feed-back audio-frequency amplifier coupled to said modulator amplifier stage for applying said audio-frequency modulating signal to the high-level modulator means for modulating said class "C" amplifier in phase with the envelope of the modulated signal applied thereto from said signal-forming means, said feed-back amplifier having means for controlling the phase and amplitude of the modulating signal translated therethrough.

12. A high-level amplitude-modulation stereophonic signal transmitter system comprising in combination, signal-forming means providing a modulated radio-frequency output signal with composite phase and amplitude-modulation information thereon representative of two stereophonically related sound signals, a broad-band linear radio-frequency signal amplifier, an electronic-tube class "C" radio-frequency signal output amplifier having a signal-input grid circuit coupled through said broad-band amplifier with said signal forming means for receiving the full modulated signal output therefrom, high-level modulator means including a modulator amplifier stage coupled to said class "C" amplifier for applying high-level plate-circuit modulation thereto, envelope detector means coupled to said signal forming means for deriving therefrom an audio-frequency modulating signal representative of the envelope of said modulated radio-frequency signal, and means including a feed-back audio-frequency amplifier coupled to said modulator amplifier stage for applying said audio-frequency modulating signal to the high-level modulator means for modulating said class "C" amplifier in phase with the envelope of the modulated signal applied thereto from said signal-forming means and with substantially the same percentage modulation, said signal forming means providing a common signal supply source for grid-circuit drive and plate-circuit modulation of said class "C" amplifier, whereby the grid drive signal voltage at said input grid circuit of the class "C" amplifier is dependent upon the modulation voltage at the plate circuit thereof, for effective reduction of spurious phase modulation in the class "C" amplifier.

References Cited in the file of this patent

UNITED STATES PATENTS

| | | |
|---|---|---|
| 2,176,587 | Goldstine | Oct. 17, 1939 |
| 2,515,619 | Weyers | July 18, 1950 |
| 2,519,223 | Cheek | Aug. 15, 1950 |
| 2,900,459 | Olive | Aug. 18, 1959 |

OTHER REFERENCES

Publication: Electronics, April 3, 1959, pages 41–46, "Recent Developments in Stereo Broadcasting" by Carroll, 179–15 Stereo.